Patented Nov. 3, 1936

2,059,981

UNITED STATES PATENT OFFICE 2,059,981

CRYSTALLIZING LACQUERS

Theodore F. Bradley, Westfield, N. J., assignor to Ellis-Foster Company, a corporation of New Jersey No Drawing. Application July 11, 1930, Serial No. 467,389

3 Claims. (Cl. 134—79)

This invention relates to coating compositions, and more particularly to nitrocellulose coating compositions adapted for use as lacquers, enamels, for making various sorts of films, etc., and relates particularly to such compositions containing non-volatile organic acids adapted to yield a crystallizing effect in coatings deposited from such compositions.

Among the objects and advantages of the present invention is the production of crystalline effects in coating compositions by the use of non-volatile organic acids, and the control of the crystalline effect obtained in such coatings.

Other objects and advantages will appear from the more detailed description set forth below, it being understood, however, that this more detailed description is given by way of explanation only and not by way of limitation, since various changes may be made therein by those skilled in the art without departing from the scope and spirit of the present invention.

While the more detailed description set forth below illustrates the production of such crystallizing coating compositions, by means of nitrocellulose or other cellulose ester compositions, it should be understood that other coating compositions than cellulose ester compositions may be utilized, the cellulose ester compositions, and particularly nitrocellulose compositions being particularly desirable examples of the coating compositions yielding crystallizing effects as explained in this application.

The organic acids which are utilized are preferably those crystallizable organic acids including aliphatic and aromatic carboxylic acids, which under the conditions leading to the deposition of coatings from the compositions chosen, produce a crystalline effect in such deposited coatings, and more desirably such acids are chosen which exert a plasticizing action in the coating composition, particularly when of the nitrocellulose type, so that any acid which does not crystallize in the coating exhibits a plasticizing effect. In this manner a double effect is obtained in the coating, in that some of the crystallizable organic acid produces a textured crystalline effect in the coating, while any non-crystallized acid in that coating exhibits its plasticizing effect. As exemplary of organic carboxylic acids that may be utilized in producing the crystalline effects referred to phthalic acid or anhydride, citric acid, tartaric acid, etc. may be utilized, or mixtures of these various acids may be employed.

As an example of a crystallizing lacquer employing phthalic anhydride, the following is given:

I

| | Parts |
|---|---|
| Phthalic anhydride | 10 |
| Low viscosity nitrocellulose | 10 |
| Butyl acetate | 25 |
| Toluol | 25 |

The parts given in the above example and in any subsequent examples are parts by weight.

The phthalic anhydride and nitrocellulose are dissolved in the mixed solvents of butyl acetate and toluol. When this solution is applied to a surface and allowed to dry by evaporation, a film is obtained showing a crystallized effect due to the crystallization of the phthalic anhydride in the film.

Another example illustrating crystallizing effects obtained with phthalic anhydride is the following:

II

| | Parts |
|---|---|
| Phthalic anhydride | 10 |
| Low viscosity nitrocellulose | 10 |
| Secondary butyl acetate | 25 |
| Isopropyl alcohol | 10 |
| Toluol | 15 |

These ingredients may be utilized to prepare a solution from which coatings may be deposited on desired surfaces, such coatings yielding a desirable crystalline effect.

It may be noted that when using such organic acid components in lacquer compositions and other coating compositions, it is advisable to employ only non-basic or non-reactive types of pigments such as titanium oxide, titanox and lithopone, the use of basic pigments such as zinc oxide being somewhat detrimental, owing to the possibility of chemical action, so that in general such basic pigments or other pigments which react with the organic acids should be avoided in these compositions.

The following example of the use of such pigments in crystallizing lacquer compositions is given:

III

| | Parts |
|---|---|
| Titanium oxide | 20 |
| Phthalic anhydride | 10 |
| Low viscosity nitrocellulose | 10 |
| Butyl propionate | 25 |
| Xylol | 25 |

In preparing such pigmented coatings, the pigment may be ground with the dissolved nitrocellulose and other ingredients in a ball mill, or the composition may be made up in any other suitable or desirable way.

It has been found that the crystallization of the organic acids in coatings deposited from the coating compositions may be controlled or entirely prevented by the incorporation of agents having such effect. For example, such agents include non-crystallizing organic acids, particularly the organic acids which exist in liquid form such as oleic acid, and in general the non-crystallizable or liquid substances which exert plasticizing effects in nitrocellulose compositions, may be used to control or to completely suppress, depending on the quantity of such agents utilized, the crystallizing effect in the coating compositions.

As an example of a composition containing a crystallizable acid which will not yield a crystallizing effect due to the presence of a nitrocellulose plasticizer, the following is given:

IV

| | Parts |
|---|---|
| Phthalic anhydride | 10 |
| Tricresyl phosphate | 10 |
| Low viscosity nitrocellulose | 10 |
| Butyl acetate | 25 |
| Toluol | 25 |

When this solution is applied to a surface and allowed to dry by evaporation, a clear and plastic film is obtained free from any crystallized effect due to the phthalic anhydride. While no crystallized effect is obtained, comparative tests without any phthalic anhydride show that the phthalic anhydride does contribute a softening or plasticizing action in addition to that of the tricresyl phosphate. So that while the presence of an ordinary type of plasticizer, such as tricresyl phosphate or dibutyl phthalate will prevent the acid anhydride in the above given composition from crystallizing, an improved plasticizing or softening action is obtained in the deposited film due to the presence of such organic acids.

The following example illustrates the use of oleic acid to prevent crystallizing effects in coatings deposited from the stated compositions:

V

| | Parts |
|---|---|
| Titanium oxide | 20 |
| Oleic acid | 5 |
| Phthalic anhydride | 5 |
| Low viscosity nitrocellulose | 10 |
| Butyl propionate | 25 |
| Xylol | 25 |

While a very satisfactory plasticized coating may be obtained with the composition given in example V above, no crystalline effect is obtained, but the phthalic anhydride acts substantially to produce a plasticizing effect in the composition.

Accordingly, when agents are employed in the coating compositions which depress, either in part or completely, the crystallizing effects, and when crystallizing effects are to be obtained, the amount of such depressing agents, should be limited so that crystallizing effects when desired, are still obtained in the composition. Such effects may be obtained with the non-crystallizing lacquer composition set forth above, by reducing the quantity of plasticizer or other depressing agent to a point where such agent does not interfere completely with a crystallizing effect. By varying the amount of such agents employed, the extent of crystallization and the effects due to such crystallization may be readily controlled in the coatings deposited from such compositions.

While oleic acid has been particularly referred to as an agent for controlling the crystallizing effect in the coating, other higher fatty acids may be utilized for a similar purpose, and particularly the free fatty acids of various animal and vegetable oils, such as peanut, corn, cottonseed, soya bean, linseed, cocoanut, fish and whale oil fatty acids may be utilized for a similar purpose.

The crystallizing effects referred to above may be obtained in any desired coating compositions, whether of the cellulose ester type, or otherwise. The cellulose compounds offer particularly desirable coatings for producing the crystallizing effects referred to. And cellulose nitrates of any of the usual types may be employed in such compositions. Ordinary soluble cotton may be employed, but the varieties of low viscosity are particularly desirable for coating compositions. Various forms of gelatinized nitrocellulose, such as celluloid and the like, may also be utilized. Celluloid scrap or moving picture film constitutes a cheap source of the material. As ordinarily obtained, the viscosity of such cellulose esters is too high for the best types of coating compositions owing to difficulties of spreading solutions having the desired high concentration of solid material. The viscosity may be reduced by treatment with chemical agents, such as ammonia or other alkalies, or by simply heating at temperatures between 100 and 140° C. Smokeless powder likewise treated may be used as bases for products of the present invention. Cellulose acetate or cellulose ethers or other cellulose compounds may be employed, and particularly in conjunction with cellulose nitrate.

The coating composition, particularly when of the nitrocellulose type, may be desirably compounded with additional ingredients, and particularly by the employment of resins. Natural resins, such as damar gum, copals, shellac, and the like, may be used, as well as the esters of such resins, such as ester gum. However, since in such nitrocellulose compositions, it is particularly desirable to utilize resins which are compatible with the nitrocellulose, compatible synthetic resins are particularly desirable ingredients of such compositions. Such resins include primarily the resins of the polyhydric alcohol-polybasic acid type produced with such acids as phthalic acid, etc., and polyhydric alcohols, such as glycerol, polyglycerol, the glycols, glycol ethers, pentaerythritol, etc. Rosin phthalic glyceride is a readily available and inexpensive synthetic resin that may thus be employed in these compositions, since this resin blends adequately with nitrocellulose and is compatible with it to a high degree. The synthetic products are decidedly superior to the natural resins or their esters, such as damar and ester gum, not only because of the better blending qualities or higher degree of compatibility found in the case of the synthetic products, but also because the natural resins vary greatly in quality, and contain dirt and impurities. The use of such resinous materials substantially increase the total dissolved solids, so that less solvent is required to secure a coating of adequate thickness. The synthetic resins compatible with nitrocellulose may be used in any desirable proportion and in excess of the amount of nitrocellulose employed, so that the total solids in the composition are materially increased.

The solvent vehicle employed depends on the nature of the coating composition. In the production of the compositions containing nitrocellulose, it is desirable to use a volatile nitrocellulose solvent, such as acetone, methyl acetone, some of the more volatile higher ketones, methyl and ethyl acetate, and the like. For best results, it is desirable to incorporate a second nitrocellulose solvent of relatively low volatility and having a considerably higher boiling point. This group includes such ingredients as amyl acetate, diethyl carbonate, butyl alcohol, amyl alcohol, and the like. Furfural is a good solvent for nitrocellulose and has excellent water-eliminating qualities. Desirably, furfural, when employed, should be substantially free from water. A third solvent material desirably included in the composite solvent is benzol, toluol, xylol, and analogous volatile hydrocarbons. These may be employed as extending agents and cheapeners. Benzol is an excellent extending agent, but is somewhat too volatile for ease of application and may cause rippling of the surface. Consequently, it is desirably used to advantage in admixture with toluol. The latter used by itself affords excellent results. Gasoline and volatile petroleum hydrocarbons of a similar character, do not serve as good extending agents as do the aromatic hydrocarbons referred to. However, in general, any of the various nitrocellulose solvents and diluents may be employed. These include the alkyl acetates, propionates, and butyrates, ketones, ethyl lactate, ethyl oxybutyrate and other hydroxy esters, glycol ethers, in admixture with benzenoid or petroleum hydrocarbons, and in some cases alcohols, may also be used. The solvent mixture should desirably be of such character that the nitrocellulose and other ingredients of the composition are maintained in good solution. The particular solvents employed will, of course, be varied as in ordinary practice to obtain desired drying times.

In addition to the free fatty acids of the various oils referred to, and oleic acid, etc. to control or to prevent, as desired, the crystallizing effects, other agents may be included, such as the fatty oils themselves including blown or boiled rapeseed oil, castor oil, and the like.

Lacquers may be prepared for application by means of a paint brush, by spraying, flowing or dipping methods. In many cases the acids exhibiting crystallizing effects, particularly when the proportions of such acids and the other ingredients in the composition prevent complete crystallization of such acids in the deposited films or coatings, exert a very beneficial effect on the coatings, particularly when of the nitrocellulose lacquer type, favorably affecting the viscosity and brushing qualities, and thus improving the compositions.

Having thus set forth my invention, I claim:

1. A lacquer containing nitrocellulose, a crystallizable organic carboxylic acid, and free fatty acids of a glyceride oil to control crystallization of the crystallizable organic acid, the ingredients being present in proportions to yield a coating composition containing at least part of the crystallizable acid in a suppressed non-crystalline condition, whereby it exerts a plasticizing action on the nitrocellulose.

2. A lacquer composition containing a cellulose ester, a solvent therefor, a crystallizable organic acid and oil acids in amounts sufficient to exert a plasticizing action on the cellulose ester.

3. A lacquer composition containing nitrocellulose, a solvent therefor, phthalic acid and oil fatty acids in amounts sufficient to exert a plasticizing action on the nitrocellulose.

THEODORE F. BRADLEY.